Patented July 20, 1926.

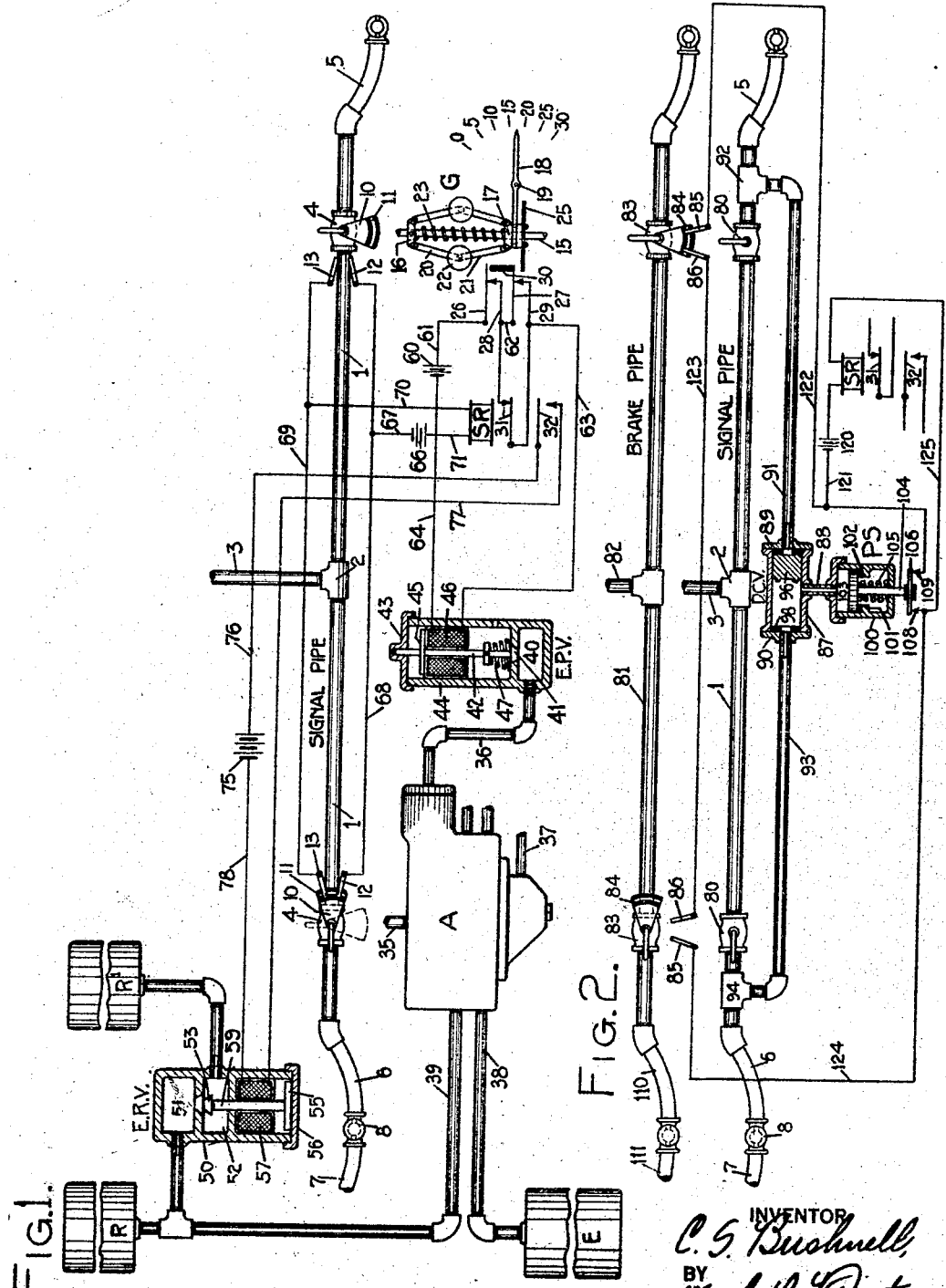

1,593,552

UNITED STATES PATENT OFFICE.

CHARLES S. BUSHNELL, OF ROCHESTER, NEW YORK, ASSIGNOR TO GENERAL RAILWAY SIGNAL COMPANY, OF GATES, NEW YORK, A CORPORATION OF NEW YORK.

TRAIN CONTROL.

Application filed October 9, 1922. Serial No. 593,375.

This invention relates to automatic train control systems.

In the practical operation of railway trains, it has been found that there is a decided difference in the operating characteristics of the train control equipment for the two general classes of trains, namely, freight and passenger. The latter class, in most instances, may be considered to include express and mail trains also. The difference in the operating characteristics manifests itself in two particulars, in that, (1) the speed of freight trains, due to various conditions, is generally lower than that of passenger trains, and (2) that with the use of the present standard automatic air-brake system, it is much more difficult to stop a long freight train safely under various conditions, such as, slack between cars, speed, grade, and other trackway conditions, than it is to stop a passenger train under similar conditions.

In the ordinary operation of railway systems, it is often found desirable or necessary to use certain engines for pulling passenger trains at times, whereas at other times the same engine will be used for pulling freight trains. This means that engines for such dual service should have train control equipment capable of adjustment or selection to provide the proper speed limits and type of brake application suitable for freight and passenger trains; but it is believed that it is not sufficient to merely provide for such adjustment or selection, because if left solely to the engineer or other employee, a freight train might through carelessness or otherwise be running with a passenger train set-up of speed limits, or perhaps vice versa, although the change from freight to passenger is more likely to be made to take advantage of the higher speed limits.

With the above problems and other considerations in mind, the principal objects and purposes of the present invention contemplate the provision of means whereby the engineer can obtain manually the proper set-up or adjustment of the train control equipment for the particular class of train, but which will not permit him to set up a wrong combination. Generally speaking, the adjustment or selection to give the proper speed limits and kind of automatic brake application for freight and passenger service is accomplished automatically by certain manual manipulations which are necessarily made in changing a locomotive from freight to passenger service and vice versa. More specifically, this comprises the provision of devices associated with the signal air pipe usually provided on locomotives, whereby a freight set-up is made if this signal pipe is not operatively connected with the following train, and whereby a passenger set-up is brought about if this signal pipe is operatively connected to following cars.

Further objects contemplate the provision of suitable means for effecting a passenger set-up if an engine-tender equipment is running alone, which more specifically consists in the provision of means and mechanisms for effecting a passenger set-up if the usual air-brake pipe is not operatively connected to cars at either end of the engine-tender equipment, regardless of the condition of the signal air pipe.

Other objects, purposes, and characteristic features of this invention will appear as the description thereof progresses.

In describing the invention in detail, reference will be made to the accompanying drawings, in which:—

Figure 1 shows a diagrammatic view of one embodiment of the invention illustrating in a simple manner how the invention may be applied to an engine provided with the usual air-signal pipe, certain elements of the system being shown in a conventional manner to illustrate their relation to the rest of the devices without showing their construction in detail; and Fig. 2 shows a modified form of the invention, which has superimposed thereon suitable devices for causing a passenger set-up when the engine-tender equipment equipped therewith is running alone.

In order to simplify the description of the present invention, it has been shown applied to a very simple type of train control system which is designed to control either a passenger or a freight train, each in its own particular manner dependent on certain adjustments of parts, and which has the two independent characteristic features heretofore mentioned, namely, (1) sets up certain restrictions in the movement of the train, (2) causes a certain kind or degree of brake application upon violation of such restrictions.

Various other types of train control devices which set up certain restrictions could have been illustrated, such as, a restriction set up by a permissive speed cam driven from the wheels of the vehicle, restrictions in distance that a train is allowed to run in a predetermined interval of time measured by a suitable time control device, restrictions in speed controlled by the flow of a fluid from an orifice, and the like. Also various restrictions between the kind or degree of brake application made when pulling a freight train as contrasted with a brake application made when pulling a passenger train might be illustrated. For instance, a passenger train may have its brakes applied automatically by venting the brake pipe to what is known as equalization pressure, whereas a freight train may be automatically braked by a lighter brake application, or even by a two-stage brake application, the first of which is very light and intended for bunching the slack, so to speak, and a second and increased brake application for effectively slowing down the train.

With these broad principles in mind, the invention has been shown in the simplest manner by illustrating means for enforcing a single but different speed limit for freight and for passenger trains, and in illustrating means for causing a different degree of brake application for these two types of trains.

In describing the several embodiments of the invention, it is assumed that the righthand end of each figure of the drawings is the pilot end of a locomotive and tender and the lefthand end is the tender end of this equipment, the tender end being that which is usually coupled to a train. The several devices forming elements of the present invention will first be separately described, after which the manner in which they are connected and in which they cooperate will be described in detail.

*Structure of Fig. 1.*—In Figure 1 of the drawings, 1 illustrates the usual air-signal pipe extending from the front end of a locomotive to the rear end of a tender coupled thereto, a T 2 being shown from which leads a branch pipe 3 to a source of air supply and a suitable signal (not shown). Near each end of this air-signal pipe 1 is provided a cut-off cock 4 for cutting off air communication between the pipe 3 and the flexible coupling or hose 5 and 6 respectively, the flexible coupling 6 being connected to a hose 7 of the first car following the tender, by a suitable coupling member 8. The cut-off cocks 4 are each provided with a blade 10, having a contact sector 11 fastened thereto but insulated therefrom, which completes an electrical circuit between the contact fingers 12 and 13 when the cut-off cock is in its open position.

Another element of the embodiment of the invention illustrated comprises a suitable speed responsive device, which in the present instance is of the centrifugal type, later referred to as a governor. This governor G comprises a shaft 15 driven from the wheels of the vehicle by any suitable means (not shown), having a collar 16 rigidly fastened thereto, and provided with another collar 17 having a peripheral groove engaging a suitable indicator 18, which is pivoted at 19. This collar 17 is slidably mounted on the shaft 15, and is connected to the collar 16 by links 20 and 21, suitable governor weights 22 being provided at the pivotal connection between these links.

A compression coil spring 23 is provided on the shaft 15 between the collars 16 and 17, which urges the governor weights 22 toward this shaft. Fixedly connected to the slidable collar 17 is a disk 25 of insulating material. Pivotally supported contact members 26 and 27 are provided which under normal conditions are in contact with stationary contacts conventionally illustrated by arrows 28 and 29 respectively. It will thus be seen that rotation of the shaft 15 will cause the governor weights 22 to separate, due to centrifugal action, and thereby moving slidable collar 17 toward the collar 16 in opposition to the tension of the spring 23; and that if a predetermined speed has been exceeded the insulating disk 25 will lift the contact 27 from stationary contact 29, and that further increase of speed will cause the insulating block 30 to lift the movable contact 26 from the stationary contact 28.

A suitable selecting relay has been provided which may take any one of a variety of forms, and has been shown conventionally and designated SR. This relay SR is provided with a front contact 31 which is closed when this relay is energized, and is provided with a back contact 32 which closes a circuit when the relay is deenergized.

A suitable pneumatically operated application valve has been provided, which has been shown in outline only and has been designated A. This application valve is provided with a pipe 35 connected to the main reservoir of the usual air-brake system, a pipe 36 for controlling its operation by a suitable electrically operated device, a pipe 37 connected to the usual brake pipe, a pipe 38 connected to an equalizing or capacity reservoir E, and a pipe 39 connected to expansion reservoirs R and R¹. This application valve is constructed to normally connect the brake pipe to the equalizing reservoir and connect the reduction reservoirs R and R¹ to atmosphere. This normal operated position of the application valve A is caused by main reservoir pressure entering through pipe 35 when the pipe 36 is closed, the abnormal or operated position of this valve taking place when the pipe 36 is connected to atmosphere. The function of this application valve A in its abnormal or operated position will be explained hereinafter in detail in connection with the operation.

The flow of pressure fluid through the pipe 36 is controlled by an electro-pneumatic valve designated E. P. V., which comprises a casing 44 having a chamber 40 and having a valve seat in which is adapted to rest a valve 41. The valve 41 is provided with a valve stem 42 slidably supported in a top cover 43 of non-magnetic material threaded on the casing 44. The valve stem 42 is provided with a disk-type armature 45, which in the deenergized condition of this device is held some distance above the coil 46 by a spring 47, whereby energization of this coil 46 attracts the armature and causes the valve 41 to rest on the valve seat.

The reduction reservoirs R and R¹ are connected by a pipe through an electrically operated reduction valve E. R. V. This reduction valve comprises a substantially cylindrical casing 50, having compartments 51 and 52 connected to the reduction reservoirs R and R¹ respectively. These compartments 51 and 52 are separated by a partition, having a valve seat in which is adapted to rest a valve 53. The valve 53 is provided with a stem 54 having an armature 55 connected thereto, this armature 55 being lifted away from the non-magnetic cover 56 to urge the valve 53 against its seat when the coil 57 is energized.

*Operation of Fig. 1.*—When the several devices are in the condition shown, that is, with the engine-tender equipment on which they are installed having its air-signal pipe 1 operatively connected to cars at either end thereof, a certain restriction upon the movement of the train will be enforced which will for convenience be called a passenger set-up in the following description of the operation of the invention. In the embodiment of the invention illustrated in Fig. 1, a movable contact 27 cooperating with a stationary contact 29 has been illustrated in association with the centrifugal speed responsive device G in a manner so that these contacts separate when a predetermined speed has been exceeded. This particular speed may be a maximum restrictive speed above which a freight train shall not travel, or may be a speed that the train shall not exceed under predetermined traffic conditions ahead, that is, this predetermined speed may be continually enforced as a maximum speed limit, or it may be a speed limit which is only enforced during a certain portion of a caution block.

The other movable contact 26 cooperating with the stationary contact 28 has been provided for enforcing a predetermined restrictive speed for passenger trains under conditions similar to those just referred to for freight trains. The selecting relay SR has been provided, among other things, for shunting the permissive speed contacts 27—29 for freight train service, so that if the relay SR is energized the breaking of connection between contacts 27 and 29 will not in any way affect the electro-pneumatic valve E. P. V.

Under the proceed conditions of the car-carried apparatus illustrated, the electro-pneumatic valve E. P. V. is energized by a circuit which may be traced as follows:— beginning at the battery 60, wire 61, movable contact 26, stationary contact 28, wire 62, movable contact 27, stationary contact 29, wire 63, winding of the electro-pneumatic valve E. P. V., wire 64 back to the battery 60. The energization of the electro-pneumatic valve E. P. V. closes an opening to the pipe 36, thereby maintaining the application valve A in the brake release position.

Under the conditions of the apparatus as illustrated in the drawings, the selecting relay SR will be energized through a circuit which may be traced as follows:—beginning at the battery 66, wires 67 and 68, contact finger 12, contact sector 11, contact finger 13, wires 69 and 70, winding of the selecting relay SR, wire 71 back to the battery 66. With this selecting relay SR energized, it will be noted that its front contact 31 provides a shunting circuit around the contacts 27 and 29, so that only a passenger restrictive speed limit will be enforced.

Let us assume that a train equipped with the apparatus illustrated in Fig. 1 is passing along the trackway and gradually increases its speed until the insulating disk 25 lifts the contact 27 from the stationary contact 29. Nothing particularly will happen at this time, because these contacts are shunted by the contact 31.

Let us assume now that the speed of the train gradually increases until the block of insulation 30 lifts the contacts 26 from the stationary contact 28. This will break the circuit through the electro-pneumatic valve E. P. V., thereby connecting the pipe 36 to atmosphere. This will cause the application valve A to connect pipes 38 and 39 together, thereby allowing the air which is contained in the equalizing reservoir E to flow into the reduction reservoirs R and R¹ until equalization of pressure takes place. The ratio of volume of the equalizing reservoir E to that of the sum of the reservoirs R and R¹ is such that the desired reduction of pressure below that at which the equalizing reservoir pressure was prior to the operation of the valve A takes place, that is, the ratio of these reservoirs is such that after the valve A has moved to its brake applying position, a pressure standard has been set up which bears a certain relation to the initial brake pipe pressure. The application valve A is further constructed so that when this valve is in its brake applying position, brake pipe pressure from the brake pipe 37 will be allowed to escape to atmosphere until this pressure is the same as the pressure standard set up in the equalizing reservoir E, this being accomplished in a well-known manner to those skilled in the art of air braking.

It is thus seen that when the air-signal pipe 1 has one of its cut-off cocks 4 open, which is only true when this signal pipe is operatively connected to the following cars, that the selecting relay SR will be energized thereby cutting out the lower permissive speed limit intended for freight train purposes only, and will cause the electropneumatic valve E. P. V. to be deenergized when the passenger permissive speed limit has been exceeded; and that an application of the brakes occurring under these conditions will cause a brake application corresponding to a reduction of pressure due to the equalization between the equalizing reservoir E and both the reducing reservoirs R and R¹, which reduction is greater than would be true if reservoir E was allowed to equalize with reservoir R only.

Let us assume now that this engine equipment is pulling a freight train and therefore will not have the signal pipe operatively connected to following cars, it being assumed that freight trains are not provided with signaling hose. Under this condition, both of the cut-off cocks 4 will be closed and the selecting relay SR will be deenergized for obvious reasons. The deenergization of the selecting relay SR opens the contact 31 and causes its back contact 32 to close a circuit through the electrically operated reducing valve E. R. V., which may be traced as follows:—starting at the battery 75, wire 76, back contact 32 of the selecting relay SR, wire 77, winding 57 of the reducing valve E. R. V., wire 78 back to the battery 75. The energization of this electrically operated reducing valve E. R. V. prevents the flow of pressure fluid between reduction reservoirs R and R¹. The deenergization of the selecting relay SR now having interrupted the shunt around the contacts 27 and 29 will cause a lower permissive speed limit to be enforced, as heretofore explained.

Assuming now that the speed of the vehicle is increased until the contact 27 is separated from stationary contact 29 by the action of the disk 25, and causes interruption of the circuit through the E. P. V., thereby causing operation of the application valve A substantially as described heretofore. At this time, however, when the reservoir E is connected to the reservoir R, the fall in pressure, or reduction, is less because the reduction reservoir R¹ is now disconnected from the reservoir R. A smaller drop in pressure in the equalizing reservoir E through suitable mechanism in the application valve A causes a smaller reduction in pressure in the brake pipe 37, and consequently causes a corresponding lighter brake application, as well understood by those skilled in the art of air braking.

An arrangement of devices has, therefore, been provided which, when the air-signal pipe is not in use, will enforce a low permissive speed limit in any suitable manner, either under clear, caution, or danger traffic conditions; whereby if this permissive speed limit is exceeded a light brake application will take place, because the equalizing reservoir E is connected to a single reduction reservoir R, thereby causing a slight reduction in brake pipe pressure and a corresponding brake application; whereas, if this air-signal pipe 1 is operatively connected to the air-signal pipe of a following train, a higher permissive speed limit will be set up which if exceeded will cause a more severe or harder brake application. This harder brake application taking place because the pressure of the equalizing reservoir E will be reduced to a lower pressure on account of the fact that it at this time will be connected to two reduction reservoirs R and R¹, whereby a heavier brake application will be affected which is considered safe for passenger train purposes.

In the braking of passenger trains, it is generally considered safe to apply the brakes as hard as the present automatic air brake system permits without fear of endangering the equipment, or safe stopping of the train; whereas a severe and heavy brake application on a freight train, especially if it is very long and loaded, is considered dangerous on account of the possibility of buckling the train due to the braking of the first part of the train before that of the rear end thereof on account of the time necessary for the reduced brake pipe pressure to travel to the rear end of such a train.

*Modification in Fig. 2.*—In Fig. 2 of the drawings has been illustrated a modified form of the present invention in which the selecting relay SR is controlled in a different manner. Several different elements are provided in this form of the invention, which will first be described in detail, after which the operation of the system will be briefly described.

In this embodiment of the invention, the air-signal pipe 1 is provided with a simple form of cut-off cock designated 80, both at the front and rear ends of the engine-tender equipment. The usual air-brake pipe, used in this form of the invention, is designated 81 and is provided with a branch pipe 82 leading to the usual engineer's brake valve (not shown). Near both ends of this brake pipe 81 is provided a cut-off cock 83 constructed substantially the same as the cut-off cocks 4 illustrated in Fig. 1. These cut-off cocks are provided with an insulated contact sector 84, which is adapted to close a circuit through the contact fingers 85 and 86 when this cock is in the closed position.

Another element of the modified form of the invention illustrated comprises a double check valve D. C. V., which consists of a cylinder 87 having a pipe 88 leading from the middle portion thereof, and provided with cylinder heads 89 and 90 respectively. The cylinder head 89 is provided with a pipe 91 connecting to a T 92 in the signal-pipe 1 just ahead the cut-off cock 80, whereas the cylinder head 90 is provided with a pipe 93 which connects to a T 94 similarly connected in the signal pipe on the tender end thereof. Within the cylinder 87 is slidably contained a piston 96. Each end of the piston is provided with a circular ridge adapted to engage a packing ring 98 in the end of the cylinder.

A suitable pneumatically operated switch PS forms another element of the present invention, which comprises a cylinder 100 provided with an internal flange 101 having a packing ring 102 adjacent thereto, and having its one end connected to the pipe 88. Slidably contained in this cylinder is a piston 103, having a piston rod 104 extending through the other end of the cylinder 100. This piston 103 is normally urged to the upper position by a compression coil spring 105 contained on the piston rod 104. To the extreme end of the piston rod 104 is connected a contact disk 106 by suitable insulating means. This contact disk 106, when in its normal position, will electrically connect two stationary contacts conventionally shown as arrows 108 and 109. It is thus seen that if pressure fluid is admitted into the cylinder 100 above the piston 103, that this piston will be moved downward against the tension of the spring 105, thereby bridging the stationary contacts 108 and 109 by the contact disk 106.

Let us assume now that an engine equipped with the apparatus illustrated in Fig. 2 is connected to a passenger train by the rear end of its tender, thereby requiring a connection between the signal hose 6 of the tender and the signal hose 7 of the following train, and likewise requiring a connection between the air-brake hose 110 of the tender and the air-brake hose 111 of the first following car. Under this condition, both the signal pipe cut-off cock and the brake pipe cut-off cock on the tender end of the equipment will necessarily be opened, whereas the corresponding cocks on the pilot end of the equipment will be in their closed position. Under this the passenger train condition, the presence of pressure in the signal pipe to the rear of the cut-off cock 80 on the tender will produce a pressure in the pipe 93, thereby forcing the piston 96 of the double check valve D. C. V. toward the right, the pipe 91 being open to atmosphere. The piston 96, in moving to the right, strikes packing ring 98 and forms a tight air seal to prevent any leakage past said piston to atmosphere. Such movement of piston 98 also allows pressure fluid to enter the pneumatic switch cylinder 100 and move the piston 103 downward, thereby causing the contact disk 106 to bridge stationary contacts 108 and 109. The bridging of these contacts will energize the selecting relay SR, thereby causing a passenger train set-up substantially in the same manner as described in connection with Fig. 1.

If the locomotive and tender should happen to be connected to a passenger train at its front or pilot end, then valve 80 at its tender end would be closed, while valve 80 at the other end would be opened to establish a connection between the air-signal system and the signal line of the train. Under these conditions, piston 96 of the double check valve D. C. V. would be shifted to the other or lefthand position; but pressure would still be applied to air switch PS, with the same result described.

When the locomotive equipped as shown in Fig. 2 is coupled to a freight train, both cut-off cocks 80 are closed, because there is no signal pipe or line on a freight train, and these cocks must be closed to prevent escape of air from the signal pipe. Under these circumstances, there is no pressure in either pipe 91 or 93, and the air switch PS opens, deenergizing selecting relay SR to make the freight train speed limit effective and by energizing coil 57 of valve E. R. V. disconnect reduction reservoir $R^1$ and limit the reduction in brake pipe pressure of an automatic application to that suitable for freight trains.

It should be noted that the presence of the brake pipe and associated parts have not performed any function as far as the operating conditions thus far described is concerned. To explain functions of this brake pipe, let us assume now that it is desired to run an engine-tender equipment alone without any following train, and that this engine-tender equipment is of a high speed type and therefore able to assume a comparatively high speed safely. Under this condition, all of the cut-off cocks 80 and 83 will be closed, because there are no co-operating hose connections to connect to. Under this condition, there will be no pressure in the cylinder of the pneumatic switch PS and the contacts 108 and 109 will not be bridged by the contact disk 106, thereby giving a freight train set-up. On the other hand, however, since both of the cocks 83 are now in their closed position, in order to prevent the escape of air from the brake pipe, a circuit is completed due to this condition of these cut-off cocks. This circuit energizes the selecting relay SR and may be traced as follows:—beginning at the battery 120, wire 121, wire 122, contact finger 85, contact sector 84, contact finger 86, wire 123, contact finger 86, contact sector 84, contact finger 85, wires 124 and 125, winding of the selecting relay SR, wire 126 back to the battery 120.

This latter circuit performs the same function as does the circuit controlled by the double check valve D. C. V., and consequently with this circuit closed through the battery 120, the selecting relay SR will maintain contact 31 closed and will open contact 32, thus allowing the engine to assume passenger train speed for predetermined traffic conditions ahead; and further energizes the valve E. R. V. to allow a maximum reduction of pressure in the brake pipe in the event of operation of the application valve A. An engine-tender equipment running alone equipped with the apparatus shown in Fig. 2 may thus be restricted and controlled automatically to the same degree as a passenger train.

Having thus shown and described several embodiments of the invention as applied to an exceedingly simple form of train control system, it should be understood that this has been done for the purpose of showing and describing an application of the invention in a manner so that it may be easily understood, and not with a view of showing the particular arrangement preferably employed in practice. It should further be understood that various additions, modifications and adaptations of the particular arrangement shown may be made, without departing from the scope of this invention. For instance, if the permissive speed of a system employs the time-distance interval principle, such permissive speed may be changed by changing the timing of a suitable time element device; whereas, if a permissive speed cam is used for enforcing speed limits in a caution block, one cam may be substituted for another in changing from passenger to freight, or vice versa, by suitable circuit arrangements. Similarly, other means may be employed for cutting into service the proper train control apparatus for freight or passenger trains as conditions may require, and in a manner so that it may not be maliciously misused by the engineer, without departing from the spirit and scope of this invention.

What I desire to secure by Letters Patent of the United States, is:—

1. The method of enforcing different restrictions upon different classes of trains employing automatic train control apparatus, which consists in providing the engine pulling such train with suitable apparatus for enforcing restrictions of different character which are respectively suitable for a different class of train and which may be adjusted to enforce any one of these restrictions, and in requiring the engineer to adjust said apparatus to enforce the proper restriction for the particular train his engine is pulling before a proper operative connection for the particular train can be made between said engine and train.

2. The method of enforcing different restrictions upon different classes of trains and applying the brakes in a manner dependent on the type of train, which consists in providing the engine pulling such train with suitable apparatus for enforcing restrictions of a different character in a different manner, each suitable for a different class of train which may be adjusted to enforce any one of these restrictions, and in requiring the engineer to adjust said apparatus to enforce the proper restriction for the particular train his engine is pulling before a proper operative connection for the particular train can be made between said engine and train.

3. A device for selecting which of a plurality of train control devices shall be effective comprising, means made effective for selecting one particular train control device when the usual air-signal line between the engine and train it is pulling is in an operative condition.

4. In an automatic train control system, the combination with a locomotive provided with train control apparatus suitable for controlling a freight train and with another control apparatus suitable for controlling a passenger train, of means having its operation dependent on the condition of the air-signaling system between such locomotive and the following train for rendering one or the other of said apparatuses effective.

5. In an automatic train control system, the combination with a locomotive provided with train control apparatus suitable for controlling a freight train and with another control apparatus suitable for controlling a passenger train, of means having its operation dependent on the pressure in the air-signal pipe connecting the engine and the following train for rendering one or the other of said apparatuses effective.

6. In an automatic train control system, the combination with a locomotive provided with train control apparatus for enforcing speed limits suitable for controlling freight trains, means effective when the usual air-signal pipe is operatively connected to the following train for allowing a higher speed limit, and means effective when the usual air brake pipe of the locomotive is not operatively connected to other cars for likewise permitting said locomotive to assume higher speed limits.

7. In an automatic train control system, the combination with the usual engine-tender equipment, of means for establishing restrictive speed limits suitable for freight train purposes which if exceeded will cause a brake application suitable for such trains, and means effective if either the air-signal pipe of the equipment is operatively connected to a following train or the brake pipe of this equipment is not operatively connected to the other cars for allowing higher restrictive speed limits and for making a harder brake application if such speed limits are exceeded.

8. In a selecting apparatus, the combination of a locomtive-tender equipment having an air-signal pipe provided with a flexible connection at each end, a selecting device, a cut-off cock adjacent each flexible connection, and means for maintaining said selective device in one of its operative conditions when there is a predetermined pressure in said signal pipe between the cut-off cock and the flexible connection adjacent thereto at either end of the equipment.

9. In a selecting apparatus, the combination of a locomotive-tender equipment provided with the usual air-signal and brake pipe, each having a flexible connection at each end thereof, a selecting device, a cut-off cock in each of said pipes adjacent each of said flexible conections, and means for maintaining said selective device in one of its operative conditions when there is a predetermined air pressure in the signal pipe between a cut-off cock and the flexible connection adjacent thereto, or when both of the cut-off cocks in said brake pipe are closed.

10. In an automatic train control system, the combination with a railway train comprising the usual locomotive connected to cars and equipped with the usual air brake and signal equipment including the usual normally charged brake pipe and a signal pipe, means for automatically venting said brake pipe to a predetermined extent when predetermined speed limits are exceeded under ordinary conditions, and means for increasing the speed limits when the signal pipe of the locomotive is operatively connected to the signal pipe on said cars.

11. In an automatic train control system, the combination with a railway train comprising the usual locomotive connected to cars and equipped with the usual air brake and signal equipment including the usual normally charged brake pipe and a signal pipe, means for automatically venting said brake pipe to a predetermined degree when predetermined speed limits are exceeded, and means for effecting venting of said brake pipe to a higher degree when certain speed limits are exceeded and the signal pipe on the locomotive is operatively connected to a signal pipe on cars of said train.

12. In an automatic train control system, the combination with a railway train comprising the usual locomotive connected to cars and equipped with the usual air brake and signal equipment including the usual normally charged brake pipe and a signal pipe, means for automatically venting said brake pipe to a predetermined extent when predetermined speed limits are exceeded, and means for increasing the permissive speed limits and the degree of venting of the brake pipe if it is automatically vented when the signal pipe is operatively connected to a signal pipe on said cars.

13. In an automatic train control system, the combination with a railway train comprising the usual locomotive connected to cars and equipped with the usual air brake and signal equipment including the usual normally charged brake pipe and a signal pipe, means for automatically venting said brake pipe to a predetermined degree under predetermined traffic conditions ahead, and means for automatically changing the degree of venting of said brake pipe under such traffic conditions ahead if said signal pipe on the locomotive is operatively connected to a signal pipe on said cars.

14. In an automatic train control system, the combination with a railway train comprising the usual locomotive connective to cars and equipped with the usual air brake and signal equipment including the usual normally charged brake pipe and a signal pipe, means for automatically venting said brake pipe to a certain degree under predetermined traffic conditions ahead, and means for changing the degree of venting when the brake pipe is automatically vented if the signal pipe on the locomotive is operatively connected to the signal pipe on said cars or if the brake pipe on said locomotive is not operatively connected to a brake pipe of other cars.

15. In an automatic train control system, the combination with the usual locomotive tender equipment provided with the usual air brake apparatus, and of means for determining whether or not said locomotive-tender equipment is connected to other cars depending on the condition of said air brake apparatus.

16. In an automatic train control system, the combination with the usual locomotive provided with the usual brake pipe, and of means for determining whether said brake pipe is operatively connected to other cars comprising, a cut-off cock near each end of said brake pipe, and contacts operatively connected to said cut-off cocks.

17. In an automatic train control system the combination with a usual locomotive provided with the usual signal pipe and of means for determining whether said signal pipe is operatively connected to other cars comprising, a cut-off cock near each end of said signal pipe, and pressure responsive means for determining whether pressure exists in said signal pipe beyond either of said cut-off cocks.

18. In an automatic train control system, the combination with a railway train having a locomotive provided with the usual air brake equipment including the usual brake pipe and signal pipe, and of automatic brake applying means superimposed thereon comprising, a capacity reservoir normally connected to the brake pipe, an expansion reservoir normally connected to atmosphere, means connecting the reservoirs together for equalizing the pressures therein and venting the brake pipe to the value of the equalized pressure when predetermined traffic conditions exist, and means for increasing the volume of said expansion reservoir when the signal pipe on the locomotive is operatively connected to the signal pipe on the rest of the train, whereby the degree of brake application effected automatically is higher if the signal pipe is operatively connected to the signal pipe of the following train than when it is not so connected.

19. In an automatic train control system, the combination with a railway train having a locomotive provided with the usual air brake equipment including the usual brake pipe having the usual cut-off cocks and a signal pipe which is adapted to be connected to freight cars having only a brake pipe or to passenger cars having both a brake pipe and a signal pipe, and of automatic brake applying means superimposed thereon comprising, a capacity reservoir normally connected to the brake pipe, an expansion reservoir normally connected to atmosphere, means equalizing the pressure of said reservoirs and venting the brake pipe to the value of the equalized pressure when predetermined traffic conditions exist, and means for increasing the volume of said expansion reservoir when either the signal pipe on the locomotive is operatively connected to the signal pipe on the rest of the train or if the brake pipe of the locomotive has both of its cut-off cocks closed, whereby the degree of brake application effected automatically is higher if the locomotive is operatively connected to a passenger train or is running alone than when it is operatively connected to a freight train.

20. Apparatus for selecting one of a plurality of restrictions in train movements in train control apparatus comprising, means for selecting one particular restriction in the movements of the train when the usual air-signal line between the engine-tender equipment and the cars of the train is in operative condition and for selecting a different restriction in the movement of the train when the air-signal line is not in its operative condition.

21. Apparatus for selecting one of a plurality of restrictions in train movements of train control systems comprising, means for selecting one particular restriction in the movement of the train when the usual air brake line between the engine-tender equipment and the other cars (if any) of the train is in normal operative condition and for selecting a different restriction in the movement of the train when the said air brake line is in its abnormal condition.

22. Apparatus for selecting one of a plurality of restrictions in the movement of a train employing train control apparatus comprising, means for selecting one particular restriction in the movement of the train when the usual air-signal line at the rear end of the engine-tender equipment is connected to the following cars or when the air brake line at the rear end of the engine-tender equipment is not connected to following cars and for selecting a different restriction in the movement of the train when the air brake line alone is connected to other cars of the train.

In testimony whereof, I hereby affix my signature.

CHARLES S. BUSHNELL.